(12) United States Patent
Silvanus

(10) Patent No.: US 11,654,621 B2
(45) Date of Patent: May 23, 2023

(54) METHOD FOR PRODUCING A COMPONENT

(71) Applicant: Airbus Defence and Space GmbH, Taufkirchen (DE)

(72) Inventor: Jürgen Silvanus, Unterhaching (DE)

(73) Assignee: AIRBUS DEFENCE AND SPACE GmbH, Taufkirchen (DE)

( * ) Notice: Subject to any disclaimer, the term of this patent is extended or adjusted under 35 U.S.C. 154(b) by 1044 days.

(21) Appl. No.: 16/411,526

(22) Filed: May 14, 2019

(65) Prior Publication Data
US 2019/0351610 A1    Nov. 21, 2019

(30) Foreign Application Priority Data
May 15, 2018 (DE) .......................... 102018207520.4

(51) Int. Cl.
*B29C 64/00* (2017.01)
*B33Y 10/00* (2015.01)
(Continued)

(52) U.S. Cl.
CPC .............. *B33Y 10/00* (2014.12); *B22F 10/00* (2021.01); *B22F 10/22* (2021.01); *B22F 10/66* (2021.01); *B22F 10/85* (2021.01); *B22F 12/00* (2021.01); *B22F 12/82* (2021.01); *B29C 64/00* (2017.08); *B29C 64/10* (2017.08); *B29C 64/141* (2017.08); *B29C 64/176* (2017.08); *B29C 64/182* (2017.08); *B29C 64/20* (2017.08);
(Continued)

(58) Field of Classification Search
CPC .............................. B29C 64/141; B33Y 10/00
See application file for complete search history.

(56) References Cited

U.S. PATENT DOCUMENTS

| 2008/0041921 A1* | 2/2008 | Creehan | ............ | B23K 20/1225 |
| | | | | 228/101 |
| 2008/0251571 A1* | 10/2008 | Burford | ............ | B23K 20/1255 |
| | | | | 228/114.5 |

(Continued)

FOREIGN PATENT DOCUMENTS

CN          107671288          2/2018

OTHER PUBLICATIONS

Hang, Z.Y., Jones, M.E., Brady, G.W., Griffiths, R.J., Garcia, D., Rauch, H.A., Cox, C.D. and Hardwick, N., 2018. Non-beam-based metal additive manufacturing enabled by additive friction stir deposition. Scripta Materialia, 153, pp. 122-130. (Year: 2018).*

(Continued)

*Primary Examiner* — Nicholas R Krasnow
(74) *Attorney, Agent, or Firm* — Nixon & Vanderhye P.C.

(57) ABSTRACT

A method for producing a component is disclosed. In a first step, a planar component layer is produced on a base surface from a metal material which is above the melting temperature thereof. In a second step, shear stresses are introduced into the component layer produced in the first step by a friction pin which rotates about a rotation axis and which is pressed with a predetermined force onto an outer surface of the component layer opposite the base surface and which is moved along the entire outer surface of the component layer. Finally, in a third step, the first step is repeated on the outer surface as a base surface.

9 Claims, 3 Drawing Sheets

(51) Int. Cl.
| | |
|---|---|
| B33Y 70/00 | (2020.01) |
| B29C 64/141 | (2017.01) |
| B22F 10/22 | (2021.01) |
| B22F 12/00 | (2021.01) |
| B22F 10/66 | (2021.01) |
| B29C 64/176 | (2017.01) |
| B33Y 40/00 | (2020.01) |
| B33Y 40/20 | (2020.01) |
| B22F 10/00 | (2021.01) |
| B29C 64/20 | (2017.01) |
| B29C 64/393 | (2017.01) |
| B29C 64/182 | (2017.01) |
| B29C 64/25 | (2017.01) |
| B29C 64/307 | (2017.01) |
| B33Y 50/00 | (2015.01) |
| B29C 64/227 | (2017.01) |
| B29C 64/10 | (2017.01) |
| B29C 64/386 | (2017.01) |
| B33Y 50/02 | (2015.01) |
| B29C 64/40 | (2017.01) |
| B33Y 99/00 | (2015.01) |
| B29C 64/255 | (2017.01) |
| B33Y 40/10 | (2020.01) |
| B29C 64/30 | (2017.01) |
| B22F 12/82 | (2021.01) |
| B22F 10/85 | (2021.01) |
| B33Y 30/00 | (2015.01) |
| B29C 64/205 | (2017.01) |
| B29C 64/245 | (2017.01) |
| B33Y 80/00 | (2015.01) |

(52) U.S. Cl.
CPC .......... *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/386* (2017.08); *B29C 64/393* (2017.08); *B29C 64/40* (2017.08); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 99/00* (2014.12); *B33Y 80/00* (2014.12)

(56) References Cited

U.S. PATENT DOCUMENTS

| | | | | |
|---|---|---|---|---|
| 2009/0200275 | A1* | 8/2009 | Twelves, Jr. | B33Y 30/00 427/591 |
| 2011/0293840 | A1* | 12/2011 | Newkirk | B23K 20/1255 118/100 |
| 2012/0279441 | A1* | 11/2012 | Creehan | B23K 20/128 228/2.1 |
| 2016/0298203 | A1 | 10/2016 | Hackel | |
| 2017/0326681 | A1 | 11/2017 | Sidhu et al. | |
| 2018/0050418 | A1 | 2/2018 | Dong et al. | |
| 2018/0214975 | A1* | 8/2018 | Werz | B23K 20/122 |
| 2020/0306869 | A1* | 10/2020 | Hardwick | B33Y 30/00 |

OTHER PUBLICATIONS

Rathee, S., Srivastava, M., Maheshwari, S., Kundra, T.K. and Siddiquee, A.N., 2018. Friction based additive manufacturing technologies: principles for building in solid state, benefits, limitations, and applications. CRC Press. (Year: 2018).*

Manual, E.A.A., 2015. Joinino 7. Solid state weldino. Dostopno na: https://european-aluminium.eu/media/1522/7-solid-state-welding. (Year: 2015).*

German Office Action for DE102018207520.4, 17, 5 pages, dated Dec. 17, 2018.

Jianglong Gu et al.: "Deformation microstructures and strengthening Mechanisms for the wire +arc additively manufactured Al-Mg4. 5Mn alloy with inter-layer rolling"; Materials Science & Engineering: A, vol. 712, 2018, pp. 292-301.

Partial European Search Report in German for European Application No. 19174262.6, dated Aug. 2, 2019, with English Translation, 31 pages.

* cited by examiner

METHOD FOR PRODUCING A COMPONENT

CROSS RELATED APPLICATION

This application claims priority to German Patent Application DE 102018207520.4, filed May 15, 2018, the entire contents of which are hereby incorporated by reference.

TECHNICAL FIELD

The invention relates to a method for producing a component. More specifically, the invention is directed toward a structural component for an aircraft or spacecraft.

BACKGROUND

In generative or additive production methods, also generally referred to as "3D printing methods", based on a digitised geometric model of an object one or more starting materials are layered one above the other sequentially in layers and solidified or hardened. So-called build-up welding, which is frequently used for surface coating, can also be used as an additive production method. In this instance, a metal material is used as a starting material, wherein the individual layers are generally applied in molten, liquid form. When a new layer is applied to a layer which has already been produced, there is thereby a significant thermal input into this layer which has already been produced and solidified, which may lead to a grain growth in the crystal structure of the metal material of this layer.

Jianglong Gu et al. describe in the article "Deformation microstructures and strengthening mechanisms for the wire+ arc additively manufactured Al—Mg4.5Mn alloy with interlayer rolling" (Materials Science and Engineering: A, Volume 712, 2018, Pages 292-301) a method for producing a component in which, prior to the production of an additional component layer, a component layer which was last produced is rolled in order to improve the mechanical properties of the component.

SUMMARY

The invention, in at least one embodiment, aims to provide an improved method for additive or generative production of a component.

In accordance with at least one exemplary embodiment, a method for producing a component, in particular a structural component, for an aircraft or spacecraft having the following method steps is provided:
  a) producing a planar component layer on a base surface from a metal material which is above the melting temperature thereof;
  b) introducing shear stresses and consequently imperfections or dislocations into the component layer produced in step a) by means of a friction pin which rotates about a rotation axis and which is pressed with a predetermined force on an outer surface of the component layer opposite the base surface and which is moved along the entire outer surface of the component layer; and,
  c) repeating step a) on the outer surface as a base surface.

According to this method, a component is produced by layering layers of metal material sequentially one over the other, wherein the individual layers or coats are produced from a metal material which is above the melting temperature thereof. A surface of a component layer which was last produced forms in this instance a base surface on which the subsequent component layer is produced. Since the metal material from which the subsequent component layer is produced is above the melting temperature thereof, there is a significant thermal input into the component layer below over the base surface.

A notion forming the basis of the invention involves carrying out a mechanical processing of an outer surface of a solidified, last-produced component layer, on which the additional component layer is produced in order to introduce dislocations into the crystal grid of the component layer last produced. The dislocations facilitate a distribution of the heat introduced in the component layer and inhibit the grain growth of the metal material resulting from the thermal input. This leads to a significantly improved mechanical strength of the component produced. According to the invention, the mechanical processing is carried out by means of a rotating friction pin. This pin is pressed onto or into the outer surface and travels over the entire outer surface. By means of the rotating pin, shear stresses are thereby introduced into the component layer last produced over the entire surface, whereby dislocations in the crystal grid of this layer are produced.

By rotating friction pin which presses against the outer surface, large surface pressures are achieved, whereby the shear stresses are introduced in a simple and efficient manner into the surface. In particular, the number of operating steps, that is to say, how often the friction pin has to be moved over a region of the outer surface in order to achieve a desired introduction of stresses, can be reduced in comparison with a rolling of the surface, for example, to a single operating step. The method is thereby advantageously accelerated. Another advantage is that as a result of the improved heat dissipation into the existing component layer, the newly produced component layer solidifies more rapidly and with more homogeneous grain sizes, whereby the mechanical strength is improved. Furthermore, as a result of shear stresses being introduced with a rotating friction pin, the mechanical complexity of the method is reduced since the friction pin can be guided in a simple manner automatically along the surface, for example, by means of a manipulator of an industrial robot.

Advantageous embodiments and developments will be appreciated from the dependent claims referring back to claim 1 together with the description.

According to an embodiment of the method, step b) is repeated after step c). Accordingly, after another component layer has been produced, the outer surface of the last-produced layer is processed by means of the rotating pin. In particular, this may also be carried out for a last layer which is outermost with respect to a structural direction of the component and on which no further additional component layer is produced. This is advantageous for a subsequent thermal processing of the component. Consequently, the mechanical strength of the component is further improved.

According to an embodiment, the rotation axis of the friction pin extends transversely relative to the outer surface of the component layer and the friction pin is pressed by means of an end face which extends transversely relative to the rotation axis on the outer surface of the component layer. Accordingly, the force with which the friction pin is pressed on the outer surface acts along the rotation axis and the friction pin is moved transversely relative to the rotation axis thereof along the outer surface. In particular, the rotation axis may be perpendicular to the outer surface or may extend so as to be slightly inclined relative thereto, for example, by an angle between 1 degree and 10 degrees. In this manner, with a pressing force which is low compared with rolling methods, high surface pressures are obtained.

The end face of the friction pin may include in the region of the rotation axis a recess and an abutment region which surrounds the recess and which is pressed on the outer surface of the component layer. The recess may in particular be constructed as a recess of the end face. Alternatively, the recess may also be a through-opening which completely extends through the friction pin along the rotation axis. The provision of a recess in the end face in the region of the rotation axis affords the advantage that only an outer region which is narrow with respect to a radial direction is pressed onto the outer surface of the component, whereby speed differences in a radial direction of the abutment region are reduced. This leads to an even more uniform introduction of shear stresses, which has a favourable effect on the mechanical strength of the component.

In particular, the abutment region of the end face may be constructed in an annular manner. In this instance, the abutment region is constructed as an annular face which concentrically surrounds the rotation axis of the friction pin.

According to an embodiment of the method, the friction pin is constructed from the same metal material as the component layer, wherein the force with which the friction pin is pressed onto the outer surface of the component layer is selected in such a manner that the metal material of the friction pin plasticises in a contact region with the outer surface of the component layer and is applied to the outer surface of the component layer. According to this development of the method, the friction pin is consumed in simple terms during the mechanical processing of the outer surface. As a result of the friction heat which is produced as a result of the pressure with simultaneous rotation, the metal material of the friction pin and the metal material of the component layer are changed into a plastic state. Metal material is thereby worn from the friction pin and is deposited on the surface of the component layer or is connected thereto in a materially integral manner. Consequently, at the same time as the introduction of shear stresses, there is produced an application of material, whereby the production speed of the component is further increased.

According to an embodiment of the method, the force with which the friction pin is pressed onto the outer surface of the component layer is in a range between 0.5 Kilonewton and 10 Kilonewton. In this range, shear stresses are produced in a particularly uniform manner. In particular, the force with which the friction pin is pressed onto the outer surface of the component layer may be in a range between 4 Kilonewton and 8 Kilonewton, and more specifically between 5 and 7 Kilonewton.

According to another embodiment, the friction pin is rotated about the rotation axis at a speed in a range between 100 revolutions per minute and 10000 revolutions per minute. In this range, shear stresses are produced in a particularly uniform manner.

According to another embodiment of the method, the metal material for producing the component layer is applied to the base surface in a liquid state and is changed at that location into a solid state. Accordingly, a production of the component layers is carried out in the manner of a build-up welding operation. In particular, the production of the component layer can be carried out by melting a wire of the metal material which is held over the base surface. For example, the wire can be acted on with an electrical voltage and moved in the direction of the base surface until a short-circuit is formed. After the current flow has been adjusted, the current supply is interrupted in a computer-controlled manner and the welding wire is moved back in the opposite direction. The metal material is thereby applied in droplets. The change into the solid state may be carried out, for example, by means of an active cooling by means of a cooling air flow or by the method being carried out at ambient temperature, that is to say, in a temperature range between 10 degrees Celsius and 50 degrees Celsius.

According to another embodiment of the method, the metal material is a titanium alloy, an aluminium alloy, a nickel alloy or a steel alloy. The component layers and/or the friction pin may thus be formed from one of these materials.

According to another embodiment, the production of the component layer is carried out at a construction speed greater than or equal to one kilogramme of metal material per hour. In particular, the production of the component layer can be carried out at a construction speed between 1 kilogramme of metal material per hour and 3 kilogrammes of metal material per hour. It is also thereby possible to produce large components with a high degree of mechanical strength.

According to another embodiment, after the production of the component layers a machining processing of the component is carried out. For example, after production of all the component layers, a milling step in which the component receives the final outer shape thereof can be carried out.

According to another embodiment, a thermal processing operation is carried out after the production of the component layers. For example, the component can (after production of all the component layers) be subjected in a heating furnace to a predetermined time temperature progression. In particular a stress-relief annealing operation can be carried out.

With respect to directional indications and axes, in particular directional indications and axes which relate to the path of physical structures, a path of an axis, a direction or a structure "along" another axis, direction or structure is intended to be understood to mean that they, in particular the tangents which are produced in a respective location of the structures, each extend at an angle of less than 45 degrees, more specifically less than 30 degrees, and particularly parallel with each other.

With respect to directional indications and axes, in particular directional indications and axes which relate to the path of physical structures, a path of an axis, a direction or a structure "transversely" relative to another axis, direction or structure is intended to be understood to mean that they, in particular the tangents which are produced in a respective location of the structures, each extend at an angle greater than or equal to 45 degrees, particularly greater than or equal to 60 degrees, and particularly perpendicularly to each other.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION

Some embodiments will now be described with reference to the Figures.

Figure 1:
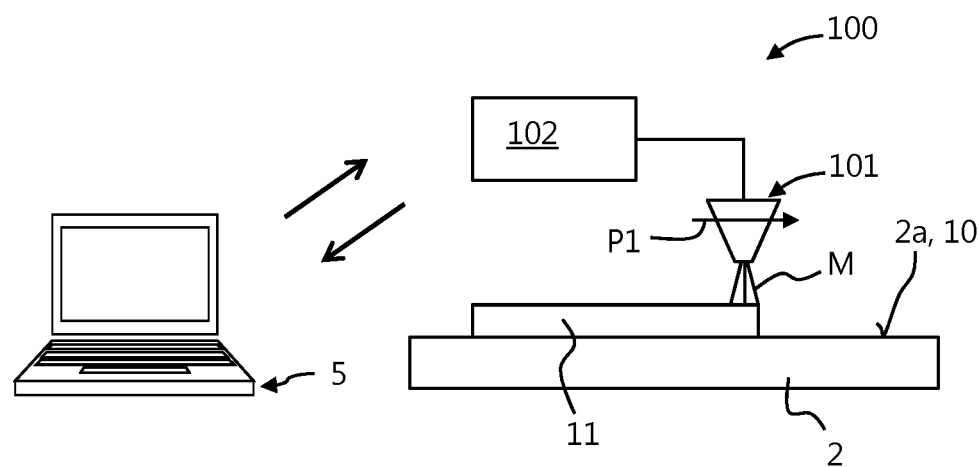
FIG. 1 shows production of a planar component layer in a step of a method according to an embodiment of the present invention.

FIG. 1 shows a first step of a method for producing a component 1. In this step, a planar component layer 11 is produced on a base surface 10. As schematically illustrated in FIG. 1, the production of the component 1 is carried out based in a digitised model of the component 1. This component model contains as data in particular dimensions which define the outer structure of the component 1 and information for carrying out the method steps explained in greater detail below. The model of the component 1 can be transmitted by a computer 5 as a data set to a production station 100 or the computer 5 can control the production station 100 on the basis of the model.

FIG. 1 schematically illustrates a production station 100 which has a material application device 101 and a manipulator 102 to which the material application device 101 is coupled and by means of which the material application device 101 can be moved based on the data set. The material application device 101 may in particular be constructed as a welding device by means of which a metal wire can be melted and applied to a surface.

As shown in FIG. 1, a first component layer 11 is produced on a base surface 10. The base surface 10 may in this instance in particular be formed by a surface 2a of a carrier plate 2. The component layer 11 is produced from a metal material M which is above the melting temperature thereof. This may in particular be carried out by the metal material being liquefied by means of the material application device 101 and applied in a liquid state to the base surface 10, where the metal material M solidifies. In order to produce a planar extent of the component layer 11, the material application device 101 is moved using the manipulator 102 along the base surface 10 in accordance with the data set of the component model, as schematically illustrated in FIG. 1 by the arrow P1.

The material application device 101 may in particular be controlled in such a manner that at least one kilogramme of metal material M per hour is applied to the base surface 10. The control of the material application device 101 is also carried out in this instance based on the data of the component model. The component layer 11 may therefore in particular be carried out at a construction speed greater than or equal to one kilogramme of metal material M per hour.

The metal material M may in particular be a titanium alloy, an aluminium alloy, a nickel alloy or a steel alloy.

Figure 2:
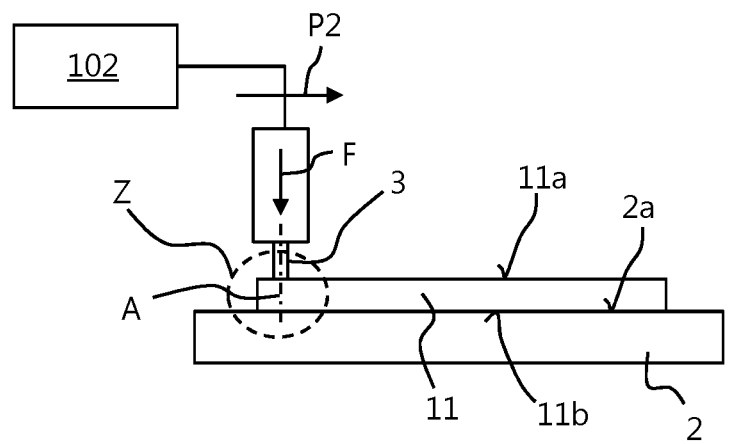
FIG. 2 shows an introduction of shear stresses into a component layer in another step of the method according to an exemplary embodiment of the invention.

FIG. 2 shows another method step. The first component layer 11 was produced completely, as described with reference to FIG. 1, wherein the metal material M of the first component layer 11 is present in particular in a solidified state. As shown in FIG. 2, the first component layer 11 abuts with a lower surface 11b the surface 2a of the carrier plate 2, which in the previous method step formed the base surface 10. An outer surface 11a of the first component layer 11 is opposite the lower surface 11b or the surface 2a of the carrier plate 2 and consequently the base surface 10.

Figure 3:
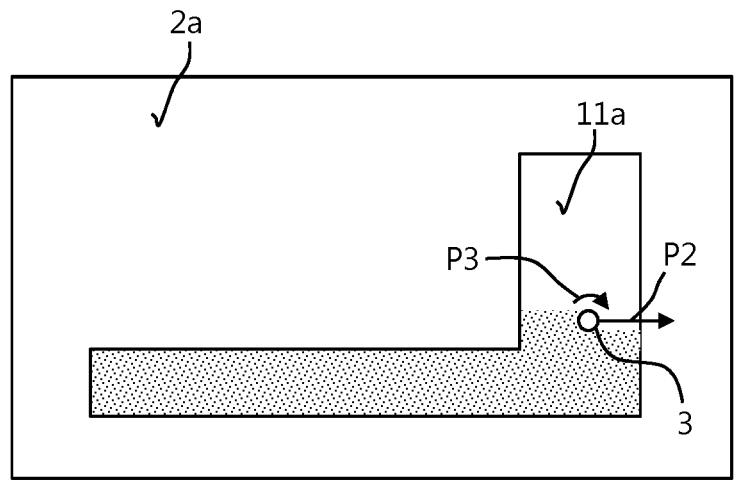
FIG. 3 is a plan view of the component layer shown in FIG. 2 during introduction of the shear stresses.

FIG. 2 shows the introduction of shear stresses in the first component layer 11. As schematically illustrated in FIG. 2, the introduction of shear stresses is carried out by means of a friction pin 3. The friction pin 3 is in this instance rotated about a rotation axis A which may extends transversely relative to the outer surface 11a of the first component layer 11 and is pressed with a predetermined force F on the first component layer 11. At the same time, the friction pin 3 is moved by means of the manipulator 102 along the outer surface 11a of the component layer 11, as illustrated schematically in FIG. 2 with the arrow P2. As can be seen in FIG. 2, the force F is directed along the rotation axis A. FIG. 3 is a plan view of the first component layer 11 during this method step. In FIG. 3, a region of the outer surface 11a of the component layer 11 which has already been mechanically processed by means of the friction pin 3 is illustrated with dots and a region which has yet to be processed is illustrated as a light surface. The friction pin 3 is accordingly moved along the entire outer surface 11a of the component layer 11 or the component layer 11 is mechanically processed over the entire surface by means of the friction pin 3. The force F by means of which the friction pin 3 is pressed on the outer surface 11a may in particular be in a range between 0.5 Kilonewton and 10 Kilonewton. A speed at which the friction pin 3 is rotated about the rotation axis A, as schematically illustrated in FIG. 3 by the arrow P3, may in particular be in a range between 100 revolutions per minute and 10000 revolutions per minute.

Figure 4:
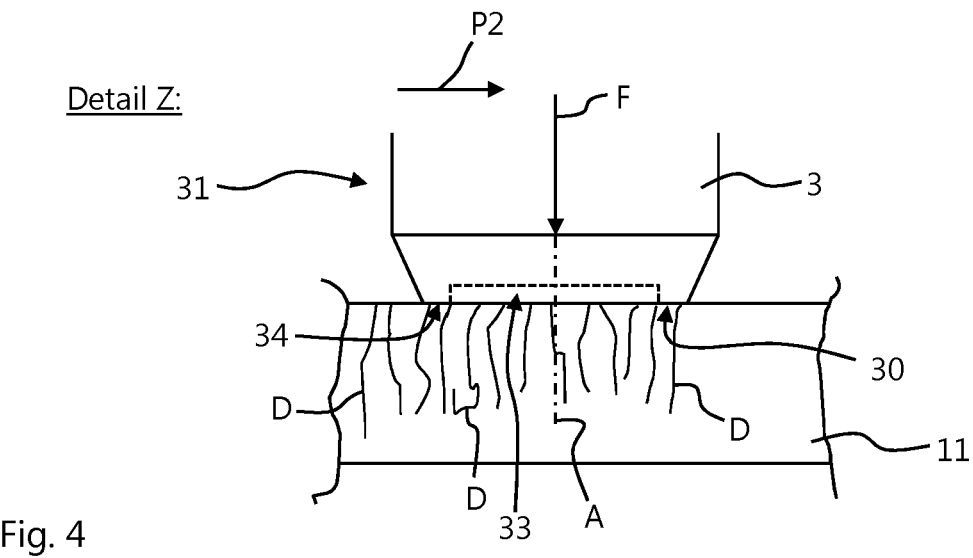
FIG. 4 is a detailed view of the region indicated in FIG. 2 with the letter Z.

As schematically illustrated in FIG. 4, the introduction of shear stresses by means of the rotating friction pin 3 leads to the formation of dislocations D in the metal material M of the first component layer 11, which is a significant advantage for the further production method, in particular with regard to the mechanical strength of the component 1. This is further explained in detail below.

As shown in FIGS. 2 and 4, the friction pin 3 may be pressed in such a manner on the outer surface 11a of the first component layer 11 that the rotation axis A of the friction pin 3 extends transversely relative to the outer surface 11a. As illustrated in particular in FIG. 4, the friction pin 3 has on a first end portion 31 an end face 30, which is pressed onto the outer surface 11a of the component layer 11.

Figure 8:
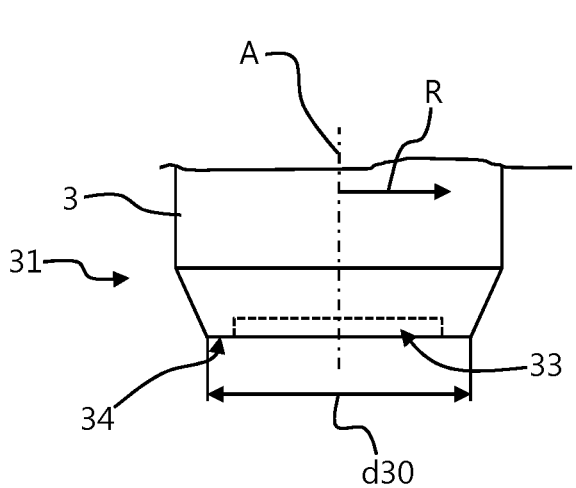
FIG. 8 is a detailed view of an end portion of a friction pin for introducing shear stresses into a component layer according to an exemplary embodiment of the invention.
Figure 9:
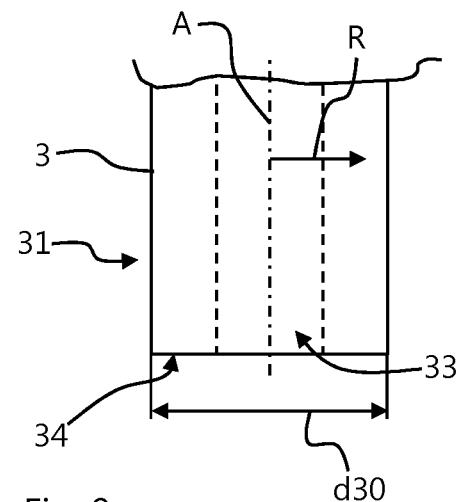
FIG. 9 is a detailed view of an end portion of a friction pin for introducing shear stresses into a component layer according to an exemplary embodiment of the invention; and, FIG. 10 is a schematic view of a thermal processing operation of a component in a step of the method according to an exemplary embodiment of the invention.

As illustrated in detail in FIGS. 8 and 9, the end face 30 extends transversely relative to the rotation axis A. With respect to a radial direction R which extends perpendicularly to the rotation axis R, the end face 30 has a diameter d30, which may in particular be in a range between 1 mm and 10 cm.

As further illustrated in FIG. 8, a diameter of the friction pin 3 along the rotation axis D may taper in the direction towards the end face 30. In FIG. 8, for example, a conical tapering is illustrated. Of course, the tapering may also be produced differently, for example, in a spherical or parabolic manner.

FIGS. 8 and 9 further show that the friction pin 3 may have a recess 33 in the end face 30. The recess 33 may in particular be formed concentrically about the rotation axis D. Furthermore, the recess 33 is surrounded by an abutment region 34. As shown in FIG. 8, the recess 33 may be constructed as a recess of the end face 30. Alternatively, the recess 33 may also be constructed as a through-opening which completely extends through the friction pin 3 about the rotation axis D, as schematically illustrated in FIG. 9. The abutment region 34 of the end face 30 may, as illustrated by way of example in FIGS. 8 and 9, be constructed in particular in an annular manner. The abutment region 34 may surround the rotation axis D concentrically.

FIG. 4 illustrates by way of example a friction pin 3 with a recess 33 which is constructed as an indentation and an annular abutment region 34 which surrounds this or the rotation axis D concentrically and which is pressed with the force F onto the outer surface 11a of the component layer 11 and rotates about the rotation axis D in order to introduce dislocations D into the component layer 11.

Figure 5:
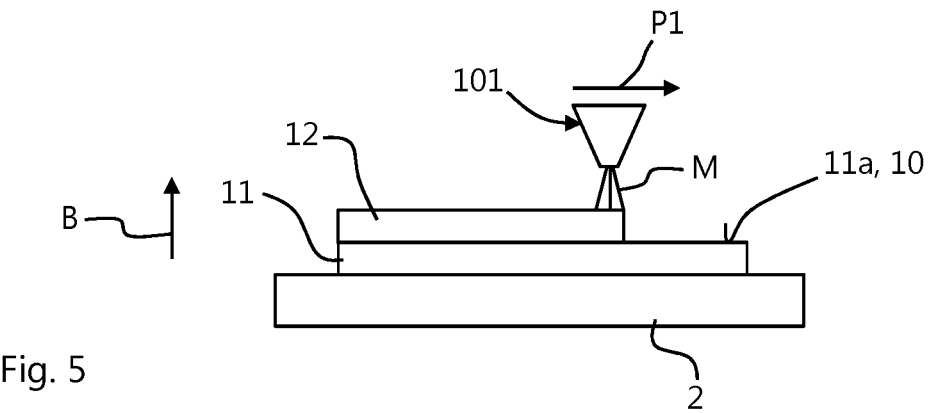
FIG. 5 shows production of another planar component layer in another step of a method according to an exemplary embodiment of the invention.

FIG. 5 shows another step of the method. In this instance, an additional second component layer 12 is produced on the outer surface 11a of the first component layer 11, as described with reference to FIG. 1. In this step, the surface 2a of the carrier plate 2 consequently no longer forms the base layer 10, but instead the base layer 10 is formed by the outer surface 11a of the first component layer 11 which is mechanically processed by means of the friction pin 3.

The dislocations D which in the previous method step were produced by means of the rotating friction pin 3 improve in particular the thermal dissipation of the metal material M, from which the second component layer 12 is produced. Furthermore, however, the dislocations inhibit a crystal growth as a result of the thermal input in the first component layer 11, which originates from the production of the second component layer 12 on the outer surface 11a of the first component layer 11 which acts as a base face 10.

Figure 6:
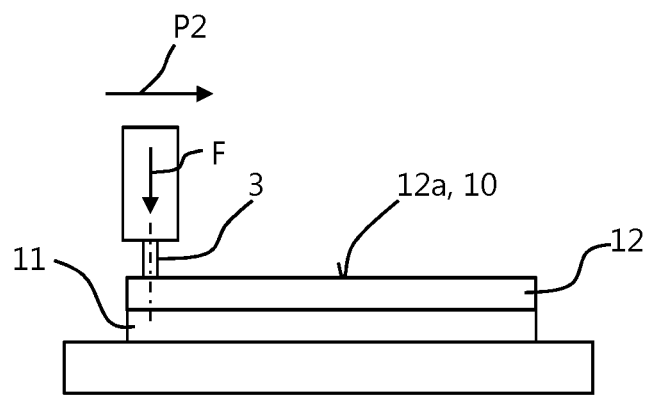
FIG. 6 shows an introduction of shear stresses into a component layer in another step of the method according to an exemplary embodiment of the invention.

As illustrated in FIG. 6, the second component layer 12 may also be mechanically processed by means of the rotating friction pin 3, as described with reference to FIGS. 2 to 4. Furthermore, afterwards another component layer (not illustrated) can be produced on the second component layer 12 thereof, in particular on the outer surface 12a which is located opposite the first component layer 11, as described above. The outer surface 12a of the second component layer 12 acts in this instance as a base surface 10.

Generally, in this manner a component 1 having a large number of component layers can be produced, wherein after the production of a component layer in each case a mechanical processing of the outer surface of the last-produced component layer is carried out by means of the rotating friction pin 3.

Figure 7:
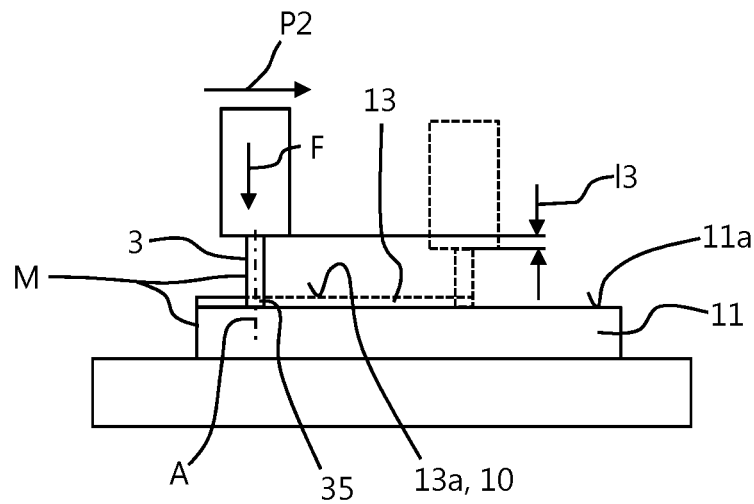
FIG. 7 shows an introduction of shear stresses into a component layer in a step of the method according to an exemplary embodiment of the invention.

FIG. 7 schematically shows a variant of the step of introducing shear stresses into the component layer 11. In this instance, the friction pin 3 is constructed from the same metal material M as the component layer 11. The force F with which the friction pin 3, in particular the end face 30 thereof, is pressed onto the outer surface 11a of the component layer 11 is in this instance selected to be so large that the metal material M of the friction pin 3 in a contact region 35 with the outer surface 11a of the component layer 11 is plasticised as a result of the resulting friction heat. As a result of the movement of the friction pin 3 along the outer surface 11a of the component layer 11 under the action of the force F, the metal material M of the friction pin 3 is eroded therefrom and is deposited as a material layer 13 on the outer surface 11a of the component layer 11. The friction pin 3 is in this instance eroded or consumed about the rotation axis D thereof. In FIG. 7, the dashed illustration shows the friction pin 3 at a later time at which a portion of the outer surface 11a of the first component layer 11 has already been mechanically processed, and the illustration of the friction pin 3 as a solid line. As can be seen in the dashed illustration, the friction pin 3 was already eroded or worn by a length l3 about the rotation axis D. This material erosion forms the material layer 13. A surface 13a of the material layer 13 opposite the first component layer 11 forms a base surface 10 for the production of an additional component layer 12, as already described above. Consequently, at the same time as the introduction of dislocations in the first component layer 11, another material layer 13 is produced.

Figure 10:
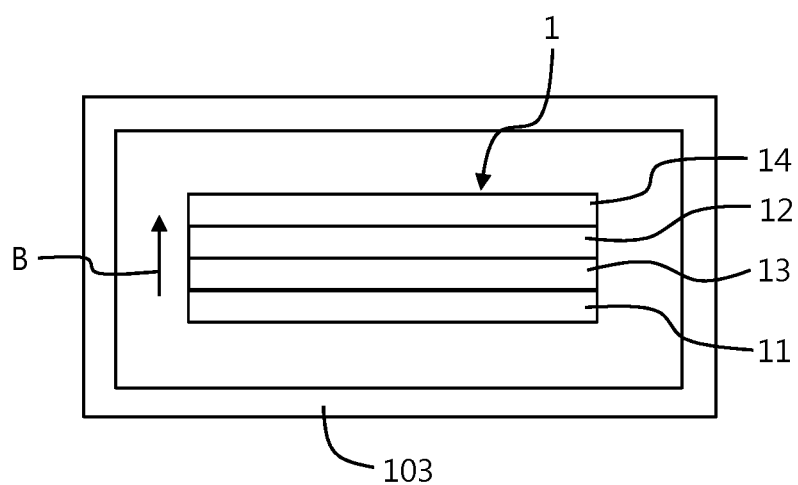

FIG. 10 shows schematically and by way of example a component 1, which was produced as described above. The component 1 shown in FIG. 10 by way of example has in particular four component layers 11, 12, 13, 14 which are located one above the other in a construction direction B. As shown in FIG. 10 by way of example, the lowest layer 11 with respect to the construction direction B was produced as explained with reference to FIG. 1. Afterwards, the material layer 13, as explained with reference to FIG. 7, was produced by means of the rotating friction pin 3 during the introduction of shear stresses into the first component layer 11. The component layers 12 and 14 were in turn applied as explained with reference to FIG. 1 or FIG. 5, wherein at least the component layer 12 as explained with reference to FIG. 6 was mechanically processed by means of the rotating friction pin 3. The component 1 shown by way of example in FIG. 10 may in particular have an L-shaped external structure, as illustrated in FIG. 3 as a plan view of the first material layer 11. The component 1 may in particular be a structural component for an aircraft or spacecraft (not illustrated), for example, a fuselage segment, a carrier face segment, a housing component or the like.

As further illustrated schematically in FIG. 10, after the production of the component layers 11, 12, 13, 14, a thermal processing operation can be carried out. To this end, the component 1 can be positioned in a schematically illustrated heating furnace 103 and be heated therein in a time-controlled manner in accordance with a predetermined temperature progression. As a result of the thermal input into the component layers 11, 12, 13, 14, there is produced a modification of the crystal structure of the metal material M of the component layers 11, 12, 13, 14. As a result of the dislocations introduced into the component layers 11, 12, 13, 14 in each case by means of the rotating friction pin 3, the thermal processing leads to a very homogeneous crystal structure, whereby the mechanical strength of the component 1 is increased.

There may be carried out a machining processing operation of the component, for example, by means of milling or grinding. This may be carried out after the thermal processing operation, if one is carried out.

Although the present invention has been explained above by way of example with reference to embodiments, it is not limited thereto, but instead can be modified in various manners. In particular, combinations of the above embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

PARTS LIST

1 Component
2 Carrier plate
2a Surface
3 Friction pin
5 Computer
10 Base surface
11 First component layer
12 Second component layer
30 End face of the friction pin
31 First end portion of the friction pin
33 Recess
34 Abutment region
35 Contact region
100 Production station
101 Material application device
102 Manipulator
103 Heating furnace
A Rotation axis
B Construction direction
D Dislocation
d30 Diameter of the end face
F Force
l3 Length change of the friction pin
M Metal material
P1-P3 Arrow
R Radial direction

The invention claimed is:

1. A method for producing a component, comprising:
a) producing a planar component layer on a base surface from a metal material (M) above its melting temperature in a liquid state and is changed at that location into a solid state;
b) introducing shear stresses into the component layer produced in step a) by means of a friction pin which rotates about a rotation axis (A) and which is pressed with a predetermined force (F) on an outer surface of the component layer opposite the base surface and which is moved along the entire outer surface of the component layer; wherein the axis of rotation of the friction pin extends transversely to the outer surface of the component layer and the friction pin is attached to the outer surface of the component layer with an end face extending transversely to the axis of rotation, wherein a recess is formed within the end face and symmetrically positioned relative to the axis of rotation, and a ring-shaped contact area of the end face bounds the recess and is configured to be pressed to the outer surface of the component layer; and
c) repeating step a) on the outer surface as a base surface.

2. The method according to claim 1, wherein the step b) is repeated after step c).

3. The method according to claim 1, wherein the friction pin is constructed from the same metal material (M) as the component layer, and wherein the force (F) with which the friction pin is pressed onto the outer surface of the component layer is selected in such a manner that the metal material of the friction pin plasticises in a contact region with the outer surface of the component layer and is applied to the outer surface of the component layer.

4. The method according to claim 1, wherein the force (F) is in a range between 0.5 Kilonewton and 10 Kilonewton.

5. The method according to claim 1, wherein the friction pin is rotated about the rotation axis (A) at a speed in a range between 100 revolutions per minute and 10000 revolutions per minute.

6. The method according to claim 1, wherein the metal material is a titanium alloy, an aluminium alloy, a nickel alloy or a steel alloy.

7. The method according to claim 1, wherein the production of the component layer is carried out at a construction speed greater than or equal to one kilogram of metal material per hour.

8. The method according to claim 1, wherein after the production of the component layers a machining processing operation of the component is carried out.

9. The method according to claim 1, wherein a thermal processing operation is carried out after the production of the component layers.

* * * * *